United States Patent
Sahai

(10) Patent No.: US 8,218,766 B2
(45) Date of Patent: Jul. 10, 2012

(54) SYSTEMS AND METHODS FOR FACILITATING TRANSACTIONS IN ACCORDANCE WITH A REGION REQUIREMENT

(75) Inventor: Anant Sahai, Berkeley, CA (US)

(73) Assignee: Sirf Technology, Inc., San Jose, CA (US)

( * ) Notice: Subject to any disclaimer, the term of this patent is extended or adjusted under 35 U.S.C. 154(b) by 717 days.

(21) Appl. No.: 10/272,491

(22) Filed: Oct. 16, 2002
(Under 37 CFR 1.47)

(65) Prior Publication Data
US 2004/0205194 A1    Oct. 14, 2004

Related U.S. Application Data

(60) Provisional application No. 60/330,131, filed on Oct. 17, 2001.

(51) Int. Cl.
*H04L 29/06* (2006.01)
(52) U.S. Cl. ....................................... 380/258
(58) Field of Classification Search .................... 380/258
See application file for complete search history.

(56) References Cited

U.S. PATENT DOCUMENTS

| | | | |
|---|---|---|---|
| 5,243,652 A * | 9/1993 | Teare et al. ................. | 380/250 |
| 5,828,751 A * | 10/1998 | Walker et al. ............... | 713/175 |
| 6,104,815 A * | 8/2000 | Alcorn et al. ............... | 380/251 |
| 6,289,314 B1 * | 9/2001 | Matsuzaki et al. ........... | 705/1 |
| 6,370,629 B1 * | 4/2002 | Hastings et al. ............ | 711/163 |
| 6,778,837 B2 * | 8/2004 | Bade et al. ................. | 455/456.1 |
| 6,985,588 B1 * | 1/2006 | Glick et al. ................ | 380/258 |
| 7,127,068 B2 * | 10/2006 | Sundaravel et al. ......... | 380/258 |
| 7,222,236 B1 * | 5/2007 | Pagel ........................ | 713/176 |
| 7,236,970 B1 * | 6/2007 | Winslow ..................... | 1/1 |
| 7,792,297 B1 * | 9/2010 | Piccionelli et al. ........ | 380/258 |
| 2002/0051541 A1 * | 5/2002 | Glick et al. ................ | 380/258 |
| 2002/0154777 A1 * | 10/2002 | Candelore ................... | 380/258 |
| 2003/0188199 A1 * | 10/2003 | Tadano et al. .............. | 713/201 |

* cited by examiner

*Primary Examiner* — David Pearson
(74) *Attorney, Agent, or Firm* — Haynes and Boone, LLP

(57) ABSTRACT

Systems and methods are provided to facilitate transactions or limit operations. According to one embodiment, region information is determined in accordance with information received by a user device from a local location device. A region requirement is also determined, and it is arranged for the user device to operate in accordance with the region information and the region requirement.

14 Claims, 9 Drawing Sheets

| TRANSACTION IDENTIFIER 702 | TRANSACTION DESCRIPTION 704 | REGION REQUIREMENT DESCRIPTION 706 | TRANSACTION STATUS 708 |
|---|---|---|---|
| T1001 | MP3 FILE | HOME | ALLOW CONTINUED OPERATION |
| T1002 | OPERATING SYSTEM | SCHOOL CAMPUS | DISABLE OPERATION |
| T1003 | APPLICATION SOFTWARE | OFFICE BUILDING | DISPLAY WARNING |
| T1004 | PURCHASE | NEW YORK, NY | REQUEST ADDITIONAL INFORMATION |

SYSTEMS AND METHODS FOR FACILITATING TRANSACTIONS IN ACCORDANCE WITH A REGION REQUIREMENT

CROSS REFERENCE TO RELATED APPLICATIONS

This application claims the benefit of U.S. Provisional Patent Application No. 60/330,131, filed Oct. 17, 2001, entitled SYSTEMS AND METHODS FOR FACILITATING TRANSACTIONS IN ACCORDANCE WITH A REGION REQUIREMENT.

FIELD

The present invention relates to transactions. In particular, the present invention relates to systems and methods for facilitating a transaction or limiting operation in accordance with a region requirement.

BACKGROUND

The location of a user device may be relevant to a transaction associated with the user device. For example, a software company might be interested in licensing a software program to be executed only on Personal Computers (PCs) that are located on a particular university campus. Similarly, a video game company might charge a first price for a Compact Disc Read Only Memory (CD-ROM) containing a video game if the game is to be played in person's home but charge a second price if the game is to be played in a business establishment. As another example, a movie company might sell a Digital Versatile Disc (DVD) containing a movie on the condition that the movie only be viewed in a particular country.

One way of determining the location of a user device is to ask a user to provide information, such as his or her ZIP code or home address. However, some users may find such a process annoying or mistakenly provide incorrect information. Moreover, some users may intentionally provide false information (e.g., in order to obtain a lower price).

It is also known that a user device may be marked in some way with location information. For example, a cookie file containing location information may be stored at the user device via a Web browser program. Such an approach may also involve a third-party database, such as a database that associates a user's location with an identifier that is hard-wired into the user device, such as an identifier that is incorporated in the INTEL® PENTIUM® III processor. This approach, however, may rely on information that was initially provided by a user and may not be correct when, for example, the user has moved his or her PC to a new home. Other user's may be reluctant to provide any type of location information at all (e.g., to a third-party) for privacy reasons.

Many DVD players are given region codes that mark where they were sold. Some DVD movies are marked with a region-encoding so that players from a different region will refuse to play them. Such region encoding systems are very constraining since the set of regions is determined in advance and can not be finely tailored to the particular content or economic transaction of interest.

Other solutions involve the use of online license servers that issue authentication tokens on the basis of IP addresses and other information that implicitly identifies the location of the user. Such systems not only involve the use of dedicated license servers that must be maintained at some expense, but also introduce serious privacy concerns due to the monitoring of the usage patterns of software. Such privacy concerns become even more serious when it is content that is access controlled. The record of connections to the license server in such cases can be used to determine who is reading what and when.

Moreover, it may be difficult for a user device to determine location information without receiving the information from a user. For example, a user device that incorporates a traditional Global Positioning System (GPS) receiver may be unable to properly determine location information when indoors. Furthermore, traditional GPS receivers involve much specialized hardware and are often expensive, making them impractical for use in mass-marked consumer oriented devices.

SUMMARY

To alleviate problems inherent in the prior art, the present invention introduces systems and methods for facilitating transactions and limiting operation based on location information.

According to one embodiment, region information is determined in accordance with information received by a user device from a local location device. A region requirement is also determined and it is arranged for the user device to operate in accordance with the region information and the region requirement.

One embodiment comprises: means for determining region information in accordance with information received by a user device from a local location device; means for determining a region requirement; and means for arranging for the user device to operate in accordance with the region information and the region requirement.

With these and other advantages and features of the invention that will become hereinafter apparent, the invention may be more clearly understood by reference to the following detailed description of the invention, the appended claims, and the drawings attached herein.

DETAILED DESCRIPTION

Embodiments of the present invention are directed to systems and methods for facilitating a transaction in accordance with a region requirement.

Transaction System Overview

Figure 1:
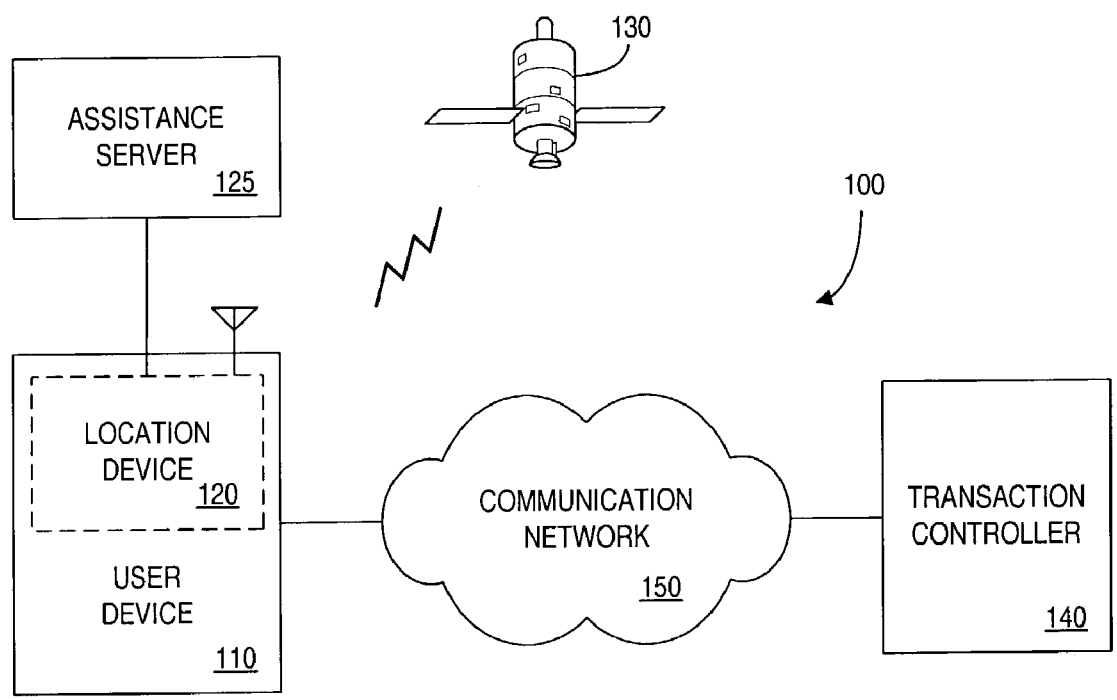
FIG. 1 is a block diagram overview of a transaction system according to an embodiment of the present invention.

Turning now in detail to the drawings, FIG. 1 is a block diagram of a transaction system 100 according to one embodiment of the present invention. The transaction system 100 includes a user device 110. The user device 110 may be, for example, a device that is not typically mobile when used by a user. For example, the user device 110 may be a PC or a server associated with a user (e.g., a person or a company). The user device 110 may also be a device that is typically used indoors by a user. For example, the user device 110 may be a home stereo system adapted to play digital audio files (e.g. MP3, RealAudio®, Windows® Media, or Ogg Vorbis files).

The user device 110 may also be a mobile device. For example, the user device 110 may be a laptop computer, a Personal Digital Assistant (PDA), and/or a wireless telephone. Note that such a mobile device could be used either indoors or outdoors (e.g., the user device 110 may be a portable music player that a persons uses both at home and when jogging outside).

The user device 110 is associated with a location device 120. The location device 120 is adapted to provide location information for the user device 110. The location device 120 may be, for example, an assisted GPS receiver that receives signals from GPS satellites 130, and possibly an external assistance data server 125, to determine location information. Note that the location device 120 may be embedded within the user device 110 or co-located with the user device 120 (e.g., the location device 120 may communicate with the user device 110 via a Universal Serial Bus port).

The user device 110 also exchanges information with a transaction controller 140 (e.g., a server associated with a software company, content provider, or an online merchant). Although a single user device 110 and transaction controller 140 are shown in FIG. 1, any number of these devices may be included in the transaction system 100.

According to one embodiment, the user device 110 exchanges information with the transaction controller 140 via a communication network 150, such as a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), an Infrared Radiation (IR) network, and/or an Internet Protocol (IP) network such as the Internet, an intranet or an extranet. Note that the devices shown in FIG. 1 need not be in constant communication. For example, the user device 110 may communicate with the transaction controller 140 on an as-needed or periodic basis.

According to some embodiments of the present invention, the user device 110 and/or the transaction controller 140 determine region information associated with the user device 110. This may be performed, for example, in accordance with U.S. patent application Ser. No. 09/888,229, filed on Jun. 22, 2001, entitled "DETERMINING THE SPATIO-TEMPORAL AND KINEMATIC PARAMETERS OF A SIGNAL RECEIVER AND ITS CLOCK BY IN FORMATION FUSION" and/or U.S. patent application Ser. No. 09/888,337, filed on Jun. 22, 2001, entitled "DETERMINING LOCATION INFORMATION USING SAMPLED DATA CONTAINING LOCATION-DETERMINING SIGNALS AND NOISE" The entire contents of these applications are incorporated herein by reference.

Transaction Method

Figure 2:
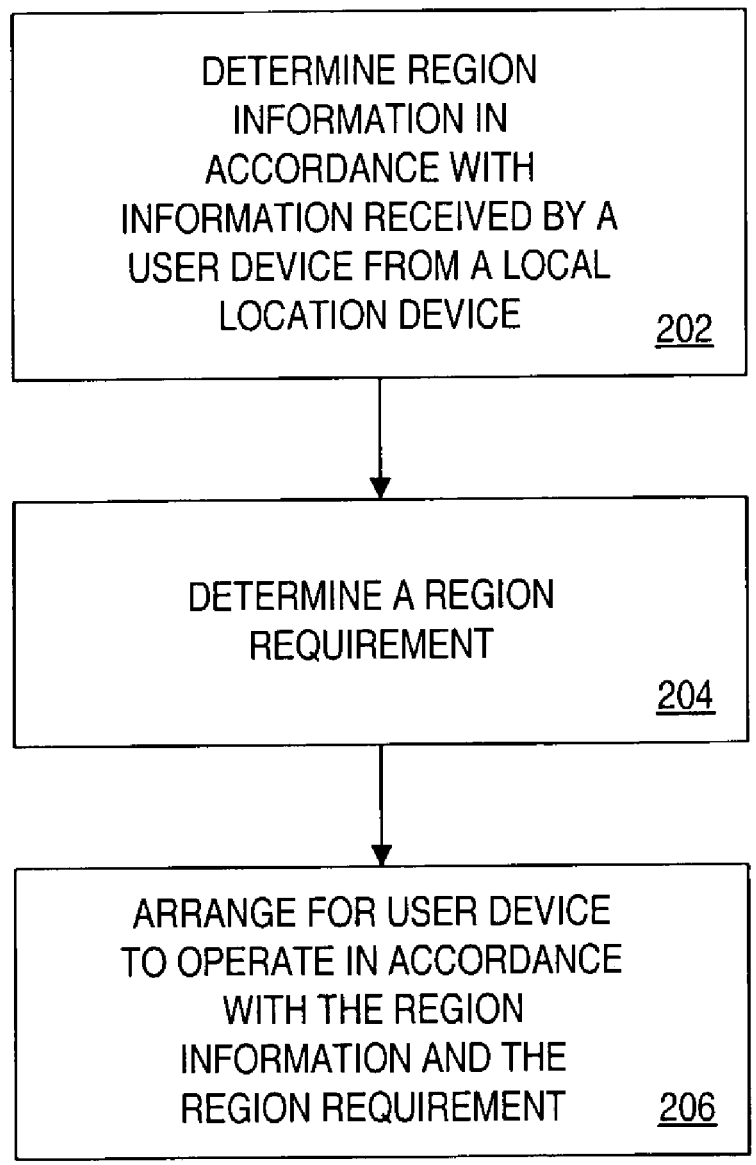
FIG. 2 is a flow chart of a method according to some embodiments of the present invention.

FIG. 2 is a flow chart of a method according to an embodiment of the present invention. The flow charts in FIG. 2 and the other figures described herein do not imply a fixed order to the steps, and embodiments of the present invention can be practiced in any order that is practicable. The method shown in FIG. 2 may be performed, for example, by the user device 110 and/or the transaction controller 140.

At 202, region information is determined in accordance with information received by the user device 110 from the local location device 120 (e.g., from an embedded assisted GPS receiver). A region requirement is determined at 204, and it is arranged for the user device 110 to operate in accordance with the region information and the region requirement at 206.

Figure 3:
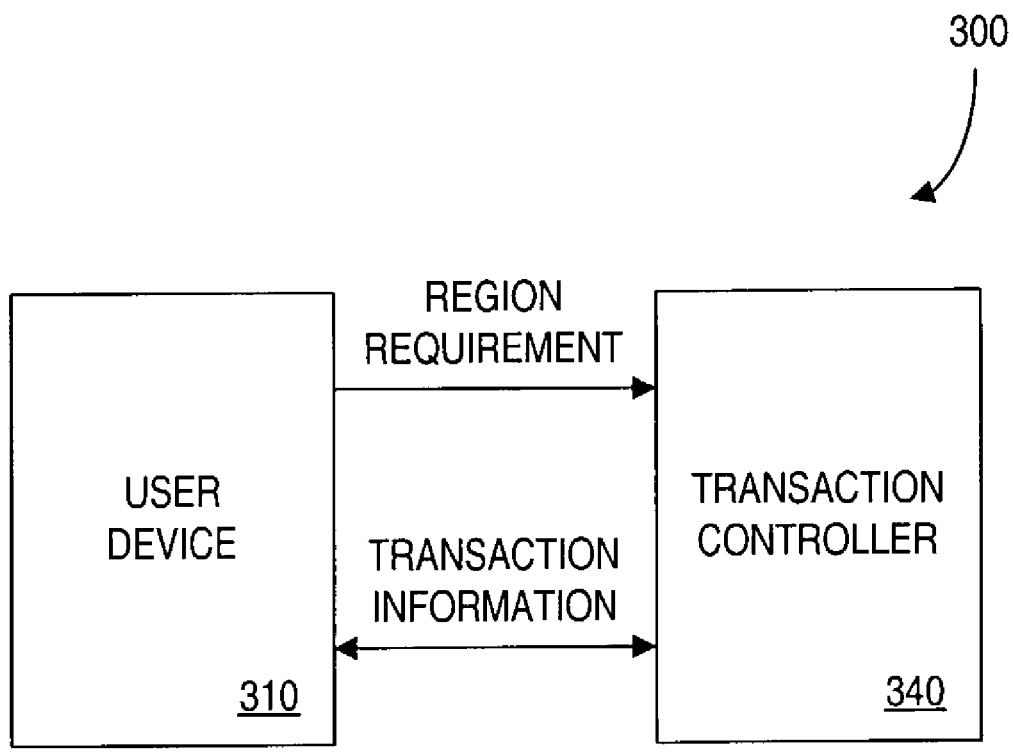
FIG. 3 is an information flow diagram according to one embodiment of the present invention.

For example, FIG. 3 is an information flow diagram according to one embodiment of the present invention. In this case, the transaction controller 340 performs the method illustrated in FIG. 2. In particular, the transaction controller 340 determines region information based on information received from the user device 310. For example, the user device 310 may receive information generated by a local assisted GPS receiver and in turn transmit region information to a remote transaction controller 340. The region information may be transmitted from the user device 310 to the transaction controller 340 via, for example, a communication network such as a public network, a proprietary network, a wireless network, and/or the Internet.

The transaction controller may then determine a region requirement (e.g., by retrieving a pre-stored region requirement) and arrange for the user device 310 to operate in accordance with the region information and the region requirement.

According to one embodiment, the transaction controller 340 transmits transaction information to the user device 310. For example, if the region information and region requirement indicate that the user device 310 is currently within an approved region, the transaction controller 340 may transmit an access code to the user device 310 to let a user access information. As another example, the transaction controller 340 may transmit a encryption key to the user device 310 to enable use of information (e.g., the use of an information file such as an MP3 file or the operation of an operating system). According to another embodiment, the transaction controller 340 instead adjusts a purchase price or other transaction term in accordance with the region information.

According to one embodiment, the region information transmitted from the user device 310 to the transaction controller 340 may indicate that the user device 310 is unable to determine a current location or region status (e.g., a probability associated with whether or not the user device 310 is within a particular region). In this case, the transaction controller 340 may arrange to receive additional information from the user device 310. For example, the transaction controller 340 may ask a user to input his or her ZIP code into the user device 310.

Figure 4:
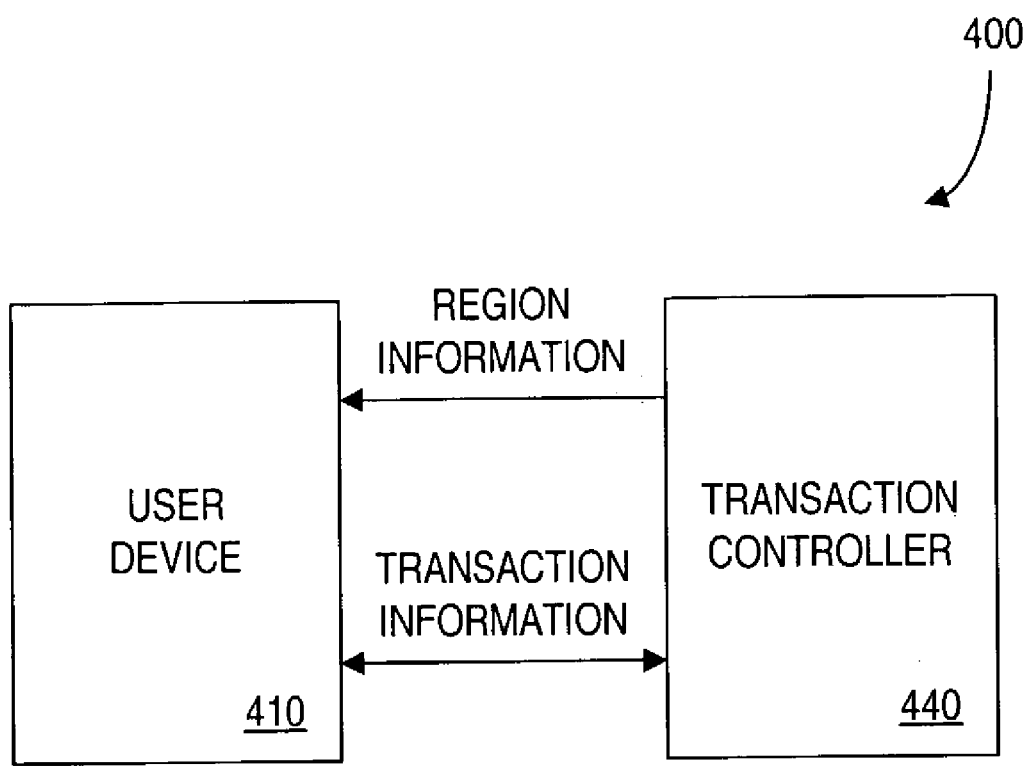
FIG. 4 is an information flow diagram according to another embodiment of the present invention.

FIG. 4 is an information flow diagram according to another embodiment of the present invention. In this case, the user device 410 performs the method illustrated in FIG. 2. In particular, the user device 410 determines the region requirement by receiving the region requirement from the transaction controller 440. For example, the user device 410 may receive information from the transaction controller 440 that defines a region boundary. The region requirement may be, for example, transmitted from the transaction controller 440 to the user device 410 via a communication network (e.g., the Internet). According to another embodiment, the region requirement is transmitted via a storage medium. For example, the transaction controller 440 may store one or more region requirements on a CD-ROM. In this case, the user device 410 can then retrieve the region requirement from the CD-ROM.

The user device 410 then determines a current location (e.g., based on information provided by an embedded GPS receiver) and arranges for the user device 410 to operate in accordance with the region information and the region requirement. For example, if the region information and region requirement indicate that the user device 410 is currently outside an approved region, the user device 410 may prevent a user from receiving information (e.g., from viewing a DVD movie).

Figure 5:
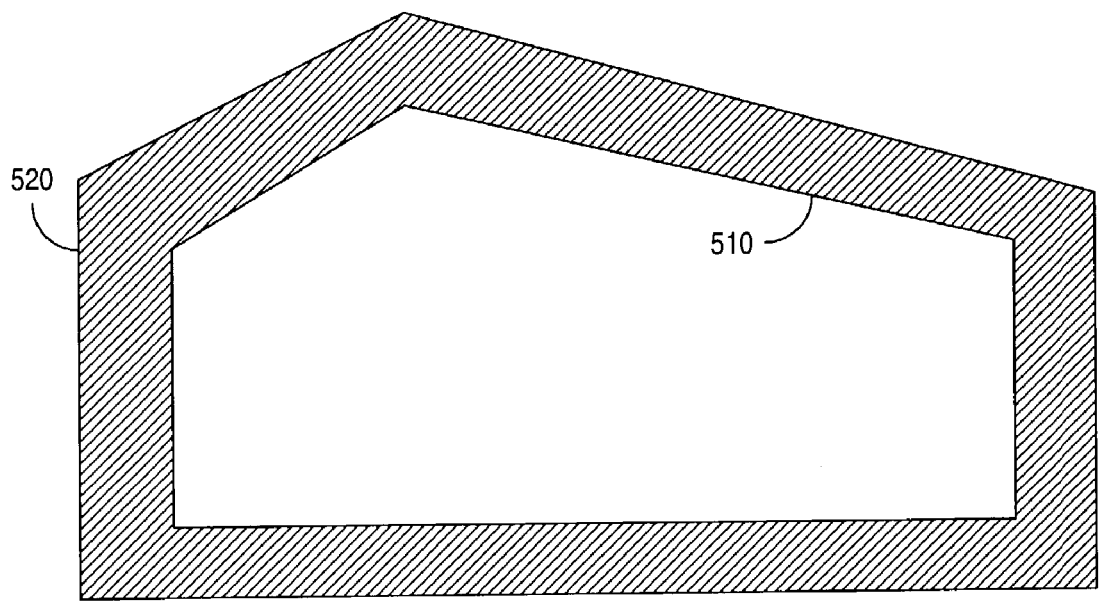
FIG. 5 illustrates a region according to one embodiment of the present invention.

FIG. 5 illustrates a region 510 according to one embodiment of the present invention. As used herein, a term "region" may refer to, for example, a two-dimensional area (e.g., a convex polygon) on the surface of the Earth or a three-dimensional area. A "region" might also include a limitation on the time dimension (e.g. a particular range of dates and times) as well. Note that a region may also refer to a plurality of discrete areas (e.g., a number of buildings used by an employer throughout a city). Also note that a region 520 may be associated with a tolerance zone 520. That is, a user device 110 may be allowed to operate even when the user device 110 is outside of a pre-determined region 510 by less than a pre-determined amount. According to one embodiment, a warning message is provided to the user in this case.

According to one embodiment, at least one of the region information and the region requirement are associated with a probability of being within a region. For example, it may be determined that the user device 110 is: (i) most probably not within the region, (ii) most probably within the region, or (iii) possibly within the region. This determination can be done in the following manner. The region of interest is converted into a plurality of interiors of convex polytopes. These polytopes are each represented by a set of linear inequalities. For each polytope, a new Linear Program can be formed by adding the corresponding set of inequalities to current inequalities representing the current information fusion region. If the Linear Program is infeasible, then it is known with high probability that the user device is not within that particular polygon. If the user device is not in any of the polygons determining the region, then it is not in the region. Similarly, if the Linear Program is feasible and such that all the constraints representing the convex polytope are not binding (this can be determined by checking shadow prices for example), then it is known that the user device is most probably contained entirely within the particular polytope. If it is entirely within any of the polytopes, then it is within the region as well. These two tests can be used as a part of the geometric termination condition. If neither test gives a conclusive result, then it is the case that at least a subset of the region lies within the current information fusion region. This is interpreted as being possibly within the region. This information can be used to drive further processing of the captured GPS signal in the hope of shrinking the information fusion region in order to make a more definite conclusion in the future.

If all the captured GPS signal has been processed and it is still inconclusive, then one can apply a standard triangulation or other fine-scale position determining method to get a single "best guess" for the position. The resulting location can be tested against the region to see if it is within the region. If it is, in some embodiments that might suffice as "most probably within" the region. Other embodiments might classify any such case as being only "possibly within the region."

It may be determined that the user device 110 is possibly within the region, for example, if: (a) no information is available (e.g. No GPS signals were acquired and so the resulting information fusion region is just the prior region), (b) information is available but is not discriminating (e.g. GPS signals were acquired, but were not enough to introduce any binding constraints along the bounded dimensions of the region of interest.) or (c) information is available and is discriminating in such a way as to be consistent with the possibility of being within the region (e.g. GPS signals were acquired and they do introduce bounds on the user device position along the constrained dimensions of the region.). In the case of (c), in some embodiments, thresholds can be used with explicit statistical models on the probabilities to decide whether the (iii.c) can be reclassified as an (i) or an (ii) for the purposes of access control. An example of such a statistical model would be a uniform spatial probability for the user device.

According to another embodiment, at least one of the region information and the region requirement are associated a region identifier (e.g., a ZIP code or country identifier) and/or coordinate information (e.g., a latitude and longitude).

Embodiments of the present invention are associated with facilitating "transactions." As used herein, a transaction may be associated with, for example, an information registration process. For example, a user device 110 and/or a transaction controller 140 may prevent a user from registering an operating system from a user device 110 located outside of a pre-determined region. Similarly, a transaction may also be associated with an information license.

According to another embodiment, a transaction is associated with an operability of executable information, entertainment information, text information, audio information, and/or image information. For example, a user device 110 and/or a transaction controller 140 may prevent a user from playing a video game via a user device 110 located outside of a pre-determined region.

According to still another embodiment, a transaction is associated with a purchase by a user. For example, a user device 110 and/or a transaction controller 140 may arrange for a user to provide payment of a first purchase price if a user device 110 is located within a first region and a second purchase price if the user device 110 is located within a second region.

According to still another embodiment, a transaction is associated with a service provided to a user via the user device 110. For example, a user device 110 and/or a transaction controller 140 may arrange for a user to receive television or radio programming information based on a region within which a user device 110 is currently located.

A user device 110 and/or a transaction controller 140 may arrange for the user device 110 to operate in accordance with region information and/or a region requirement by allowing continued operation of an aspect of the user device 110. For example, the location of the user device 110 may be monitored on a daily basis, and the user device 110 may receive a daily encryption key or hash value to enable its continued operation.

According to another embodiment, a user device 110 and/or a transaction controller 140 arrange for the user device 110 to operate in accordance with region information and/or a region requirement by disabling operation of an aspect of the user device 110. For example, a user may no longer be able to access a particular file stored on the user device 110 (e.g., a file associated with an export restriction). According to still other embodiments, operation is facilitated by arranging for a warning to be provided to a user associated with the user device 110 (e.g., either via the user device 110 itself or some other device) and/or requesting additional information from the user (e.g., by requiring the user place a telephone call).

According some embodiments, it is arranged for the user device 110 to operate without explicitly encoding the "licensing region" as a single spatial region. This is done by the use of one-way-functions, some randomized hashing salt, and an approximation of general spatial regions by simple cells that can be numbered, and other techniques relating to zero-knowledge proofs. One way of doing it is as follows. The region of interest is approximated by a set of cells. The cells are determined by the lattice formed by choosing a few cell basis vectors along the dimensions of interest. In some embodiments, these vectors are chosen in a way that includes randomness and is customized for every license grant. Each cell is identified by a sequence of integer coordinates associated with its position in the lattice. The region is then represented as a set of coordinate sequences.

Each coordinate sequence can be combined with some specified hashing salt and then run through a one-way-function to obtain a hash of the region. Any position or information fusion region can then be mapped into a set of cells corresponding to that position or information fusion region. For the information fusion region, this can be accomplished by minimizing and maximizing linear functionals over the information fusion region wherein the linear functional encodes the direction and magnitude of the cell basis vectors. By converting the resulting real-valued ranges into bounding integer ranges, a set of cells can be straightforwardly extracted. The hashes of the cells can be computed and checked against the hashes committed to in the license. According to one embodiment, the license actually covers a number of different random spatial regions at once—while making it harder for someone to determine what these spatial regions are without having to do some significant brute-force work for every license that he or she wants to extract information from. Even after that, since the license is valid in the different regions, the privacy of the information is not compromised. At the same time, the regions may be sparsely distributed. As a result, if a person was to attempt to use the licensed media outside of the true authorized region, there may be a very low chance that it would work. This achieves the dual objectives of protecting privacy while simultaneously denying access to unauthorized locations.

Note that the location-hash-cells approach can also be used in reverse when operating in the other direction. The transaction controller 140 and the user device 110 can engage in a joint computation of the license key so that it is valid for the location of the user device 110. The size and parameters of the location can be set by the transaction controller 140, while the user commits to a particular location through the hash values without revealing what it is. This way, the location is not even needed in the initial sale for more complete privacy. The transaction controller 140 is confident that it is issuing a location-limited license, and since it can choose the magnitude of the cell basis vectors, it is also confident of the spatial extent of the license, but it never needs to know where exactly that location is.

A user device 110 and/or a transaction controller 140 may further arrange for the user device 10 to operate in accordance with expiration information (e.g., an expiration date) and verification schedule information (e.g., an initial location verification, periodic location verifications, and/or random location verifications).

TRANSACTION EXAMPLES

Alice's employer purchases a license under which an operating system is allowed to be used on an unlimited number of machines within the employer's building. Alice installs the operating system on her laptop while at work. The laptop determines a current location (based on information generated by an embedded GPS receiver) and transmits the current location to a transaction controller once an hour. In response, the laptop receives a signal back from the transaction controller that allows its continued operation. An important aspect of this is that the transaction controller for license verification purposes may reside directly on Alice's laptop. So this transmission need not involve any interceptable or privacy-leaking communications. When Alice brings the laptop home one evening, the following message is displayed: "This operating system is not licensed for use at this location." Moreover, some functionality of the operating system has been automatically disabled. When she brings the laptop back to work the next morning, the operating system again functions normally.

As another example, Bob purchases a license under which an MP3 audio file can be played within his home. His portable music player periodically determines a current location via an embedded GPS receiver. When the portable music player determines that the current location is outside of a pre-determined region defined as Bob's home, the quality of the output from the music player is drastically reduced.

As still another example, a school purchases a license under which an unlimited number of people can use an application software program while on or near the school's campus. This may be accomplished, for example, by providing students with custom downloads of the product or just of a location based license key. The students are free to copy the software among themselves and to use it anywhere near the campus. Note that the license may also be based on time information (e.g., the license may only be effective during the school year). The key contains software that enables the program to run only if the location of a user device is within a certain geometric region. It may also contain an expiration or tolerance condition. Upon running the program, the location based licensing key determines whether it is necessary to get a position and/or time validation fix. For example, this may be done only at the time of first installation. It then activates the software GPS system and uses details of the license key to establish a geometric termination condition. When the system proves that the true location is outside the licenses region, the program may refuse to run, display a warning message, or perform some other license enforcing action. When the system proves that the true location is within the region, it may continue transparently and store this result in an encrypted location that it can avoid having to perform this check in the future. If the system cannot acquire a location, it may display a warning, an error message, or use another method of license verification. This is all accomplished without imposing onerous monitoring or other de-facto surveillance of the users in an attempt to enforce license compliance. The computations regarding license compliance can all be done locally on the user's machine. The only information that is leaked to the network and any eavesdroppers is the fact that the user is doing a location check—and even this occurs only in the context of getting aiding information. The difference here from a privacy standpoint is analogous to that between knowing when someone has entered the library, and knowing what exact books he is reading and when.

Transaction Device

Figure 6:
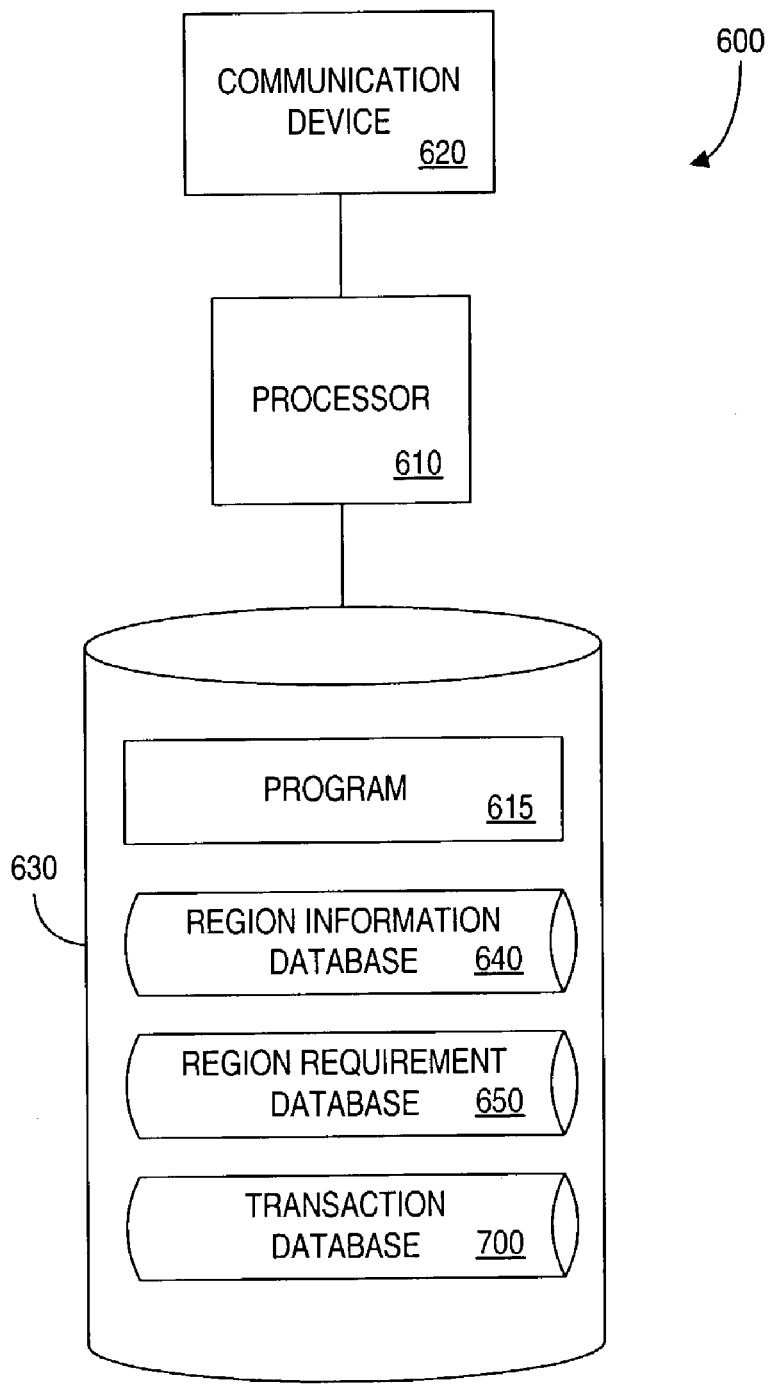
FIG. 6 is a block diagram of a transaction controller according to an embodiment of the present invention.

FIG. 6 illustrates a transaction device 600 that is descriptive of the user device 110 and/or the transaction controller 140 shown, for example, in FIG. 1 according to some embodiments of the present invention. The transaction device 600 comprises a processor 610, such as one or more INTEL® PENTIUM® processors, coupled to a communication device 620 configured to communicate via a communication network (not shown in FIG. 6). The communication device 620 may be used to communicate, for example, with one or more user devices 110, location devices 120, and/or transaction controllers 140.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 630 stores a program 615 for controlling the processor 610. The processor 610 performs instructions of the program 615, and thereby operates in accordance with the present invention. For example, the processor 610 may determine region information in accordance with information received by a user device 110 from a local location device 120. The processor 610 may further determine a region requirement and arrange for the user device 110 to operate in accordance with the region information and the region requirement.

As used herein, information may be "received" by or "transmitted" to, for example: (i) the transaction device 600 from a transaction user device 110 or a transaction controller 140; or (ii) a software application or module within the transaction device 600 from another software application, module, or any other source.

Figure 7:
FIG. 7 is a tabular representation of a portion of a transaction database according to an embodiment of the present invention.

As shown in FIG. 6, the storage device 630 also stores a region information database 640 (e.g., indicating current and/or prior user device locations); a region requirement database 650 (e.g., defining one or more regions); and a transaction database 700 (described with respect to FIG. 7). An example of a database that may be used in connection with the transaction system 100 will now be described in detail. The illustration and accompanying description of the database presented herein is exemplary, and any number of other database arrangements could be employed besides those suggested by the figure.

Transaction Database

Referring to FIG. 7, a table represents the transaction database 700 that may be stored at the transaction device 600 according to an embodiment of the present invention. The table includes entries identifying transactions that have been, or are being, facilitated via the transaction system 100. The table also defines fields 702, 704, 706, 708 for each of the entries. The fields specify: a transaction identifier 702, a transaction description 704, a region requirement description 706, and a transaction status 708. The information in the transaction database 700 may be created and updated, for example, based on information received from a user device 110, a location device 120, and/or a transaction controller 140.

The transaction identifier 702 may be, for example, an alphanumeric code associated with a transaction that has been, or is being, facilitated via the transaction system 100. The transaction description 704 describes the transaction (e.g., by indicating a transaction category, a user identifier, and/or a user device identifier).

The region requirement description 706 may describe one or more regions within which (or outside of which) a transaction will be allowed. This may be accomplished by listing a set of cells, hashes, polytopes, or symbolic pointers to region information. The transaction status 708 may indicate, for example, that continued operation of a user device 110 is being allowed, that operation has been disabled, that a warning is being (or has been) displayed, or that additional information has been requested from a user or user device 110.

Transaction Controller Method

Figure 8:
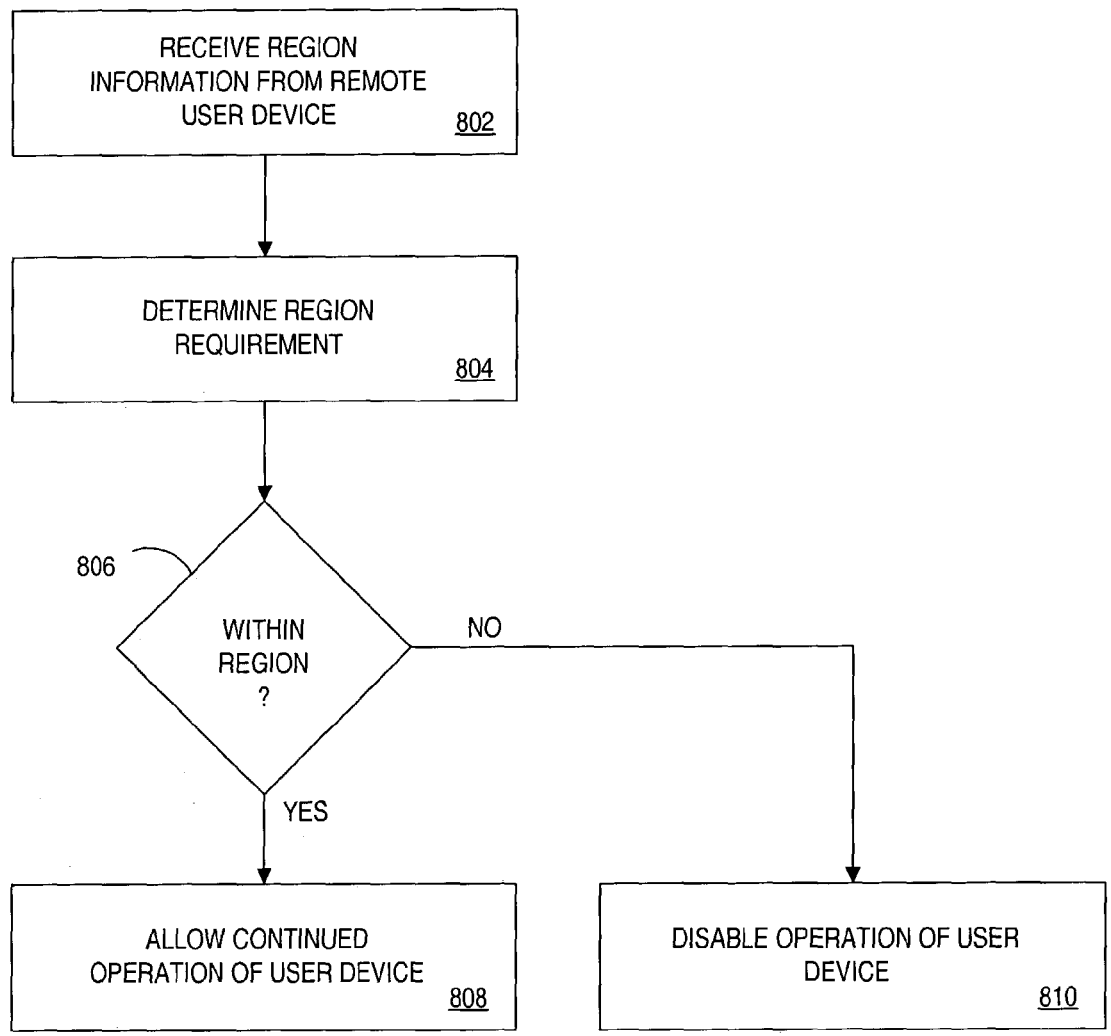
FIG. 8 is a flow chart of method performed by a transaction controller according to some embodiments of the present invention.

FIG. 8 is a flow chart of method performed by a transaction controller 140 according to some embodiments of the present invention. At 802, region information is received from a remote user device 110. For example, the transaction controller 140 may receive from the user device 110 information generated by an embedded GPS receiver.

At 804, one or more region requirements are determined. For example, the transaction controller 140 may retrieve pre-stored region requirements associated with a software program being executed on the user device 110.

If the user device 110 is within the required region at 806, continued operation of an aspect of the user device 110 is allowed at 808. For example, the transaction controller 140 may transmit a key that lets the user device 110 decode a DVD movie. If, on the other hand, the user device 110 is not within the required region at 806, an aspect of the user device 110 is disabled at 810.

User Device Method

Figure 9:
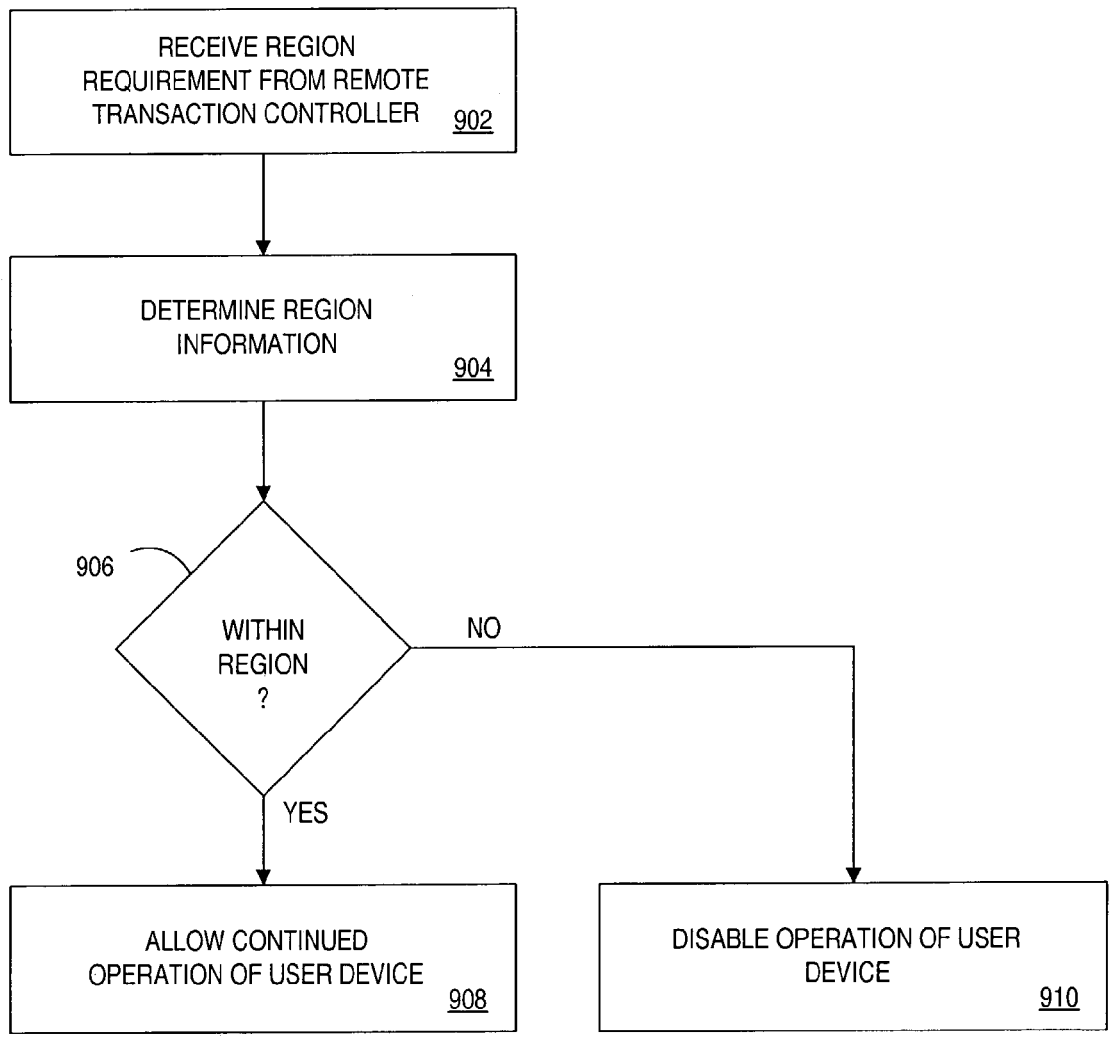
FIG. 9 is a flow chart of method performed by a user device according to some embodiments of the present invention.

FIG. 9 is a flowchart of method performed by a user device 110 according to some embodiments of the present invention. At 902, a user device 110 receives a region requirement from a remote transaction controller 140. For example, the user device 110 may retrieve one or more region requirements from a CD-ROM.

The user device determines region information at 904. For example, the user device 110 may determine region information based on information generated by an embedded GPS receiver.

If the user device 110 is within the required region at 906, continued operation of an aspect of the user device 110 is allowed at 908. For example, the user device 110 may let the user play a video game. If, on the other hand, the user device 110 is not within the required region at 806, an aspect of the user device 110 is disabled at 910.

ADDITIONAL EMBODIMENTS

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

The present invention may be used in many ways to enable business models for content delivery and targeted revenue extraction from what may otherwise be hard to monetize markets. It can also be used with secure multi-media distribution and to allow for Internet radio that is targeted as well the targeted distribution of free demonstration units.

According to another embodiment, the system takes advantage of Internet connectivity to get aiding data, but without having to compromise privacy by storing explicit location data at a central server, or even on the license key itself. A central server may be used with raw sampled data in some embodiments, but the system may not need to maintain a cookie database or persistent records.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of facilitating a transaction between a user device and a transaction controller remote from the user device, comprising:
   receiving a hashed location for the user device at the transaction controller;
   at the transaction controller, determining a hashed region requirement with respect to the hashed location that defines a region within which the user device is to be licensed with regard to a licensor based upon the hashed location, wherein the transaction controller does not have access to an unhashed location for the user device; and
   transmitting transaction information to the user device to facilitate the transaction if a comparison of the hashed location and the hashed region requirement indicates that user device is within the licensed region, wherein the hashed region requirement is encoded in a license key by a one-way function applied over parameter values that are jointly specified by the user device and the transaction controller, and wherein one of the parameter values corresponds to a spatial extent of an unhashed region requirement and wherein the hashed region requirement is not explicitly encoded as a single spatial region.

2. The method of claim 1, wherein said receiving is performed via at least one of: (i) a communication network, (ii) a public network, (iii) a proprietary network, (iv) a wireless network, and (v) the Internet.

3. The method of claim 1, further comprising: based on said received hashed location, arranging to receive additional information from said user device.

4. The method of claim 1, wherein said user device comprises at least one of: (i) a stationary device, (ii) an indoor device, (iii) a personal computer, and (iv) a server.

5. The method of claim 1, wherein said user device comprises a mobile device.

6. The method of claim 1, wherein the transaction information is an encryption key.

7. The method of claim 1, wherein the transaction information is a purchase price.

8. The method of claim 1, wherein the hashed region requirement is associated with at least one of: (i) a two-dimensional area, (ii) a three-dimensional area, and (iii) a plurality of discrete areas.

9. The method of claim 1, wherein said transaction is associated with an information registration process.

10. The method of claim 1, wherein said transaction is associated with an information license.

11. The method of claim 1, wherein said transaction is associated with an operability of at least one of: (i) executable information, (ii) entertainment information, (iii) text information, (iv) audio information, and (v) image information.

12. The method of claim 1, wherein said transaction is associated with a purchase by a user in exchange for payment of a purchase price, wherein said purchase price is based at least in part on the region information.

13. The method of claim 1, wherein said transaction is associated with a service provided to a user via the user device.

14. The method of claim 1, wherein said facilitating comprises at least one of: (i) allowing continued operation of an aspect of said user device, (ii) disabling operation of an aspect of the user device, (iii) arranging for a warning to be provided to a user associated with said user device, and (iv) requesting additional information from a user associated with said user device.

* * * * *